(12) United States Patent
Hotti et al.

(10) Patent No.: US 11,610,047 B1
(45) Date of Patent: Mar. 21, 2023

(54) DYNAMIC LABELING OF FUNCTIONALLY EQUIVALENT NEIGHBORING NODES IN AN OBJECT MODEL TREE

(71) Applicant: Klarna Bank AB, Stockholm (SE)

(72) Inventors: Alexandra Hotti, Stockholm (SE); Riccardo Sven Risuleo, Stockholm (SE); Aref Moradi, Stockholm (SE); Stefan Magureanu, Solna (SE); Jens Lagergren, Stockholm (SE)

(73) Assignee: Klarna Bank AB, Stockholm (SE)

( * ) Notice: Subject to any disclaimer, the term of this patent is extended or adjusted under 35 U.S.C. 154(b) by 0 days.

(21) Appl. No.: 17/590,776

(22) Filed: Feb. 1, 2022

(51) Int. Cl.
  *G06F 17/00* (2019.01)
  *G06F 40/134* (2020.01)
  *G06N 20/00* (2019.01)

(52) U.S. Cl.
  CPC .......... *G06F 40/134* (2020.01); *G06N 20/00* (2019.01)

(58) Field of Classification Search
  CPC .............................. G06F 40/134; G06N 20/00
  USPC .......................................................... 715/205
  See application file for complete search history.

(56) References Cited

U.S. PATENT DOCUMENTS

| | | | |
|---|---|---|---|
| 7,254,569 B2 | 8/2007 | Goodman et al. | |
| 7,343,551 B1 | 3/2008 | Bourdev | |
| 7,660,779 B2 | 2/2010 | Goodman et al. | |
| 8,214,362 B1 | 7/2012 | Djabarov | |
| 8,639,680 B1* | 1/2014 | Ciccolo | G06F 16/9535 |
| | | | 707/723 |
| 9,037,464 B1 | 5/2015 | Mikolov et al. | |
| 10,990,645 B1* | 4/2021 | Shi | G06N 3/08 |
| 11,080,597 B2 | 8/2021 | Dalle et al. | |
| 11,283,690 B1* | 3/2022 | Mosier | H04L 41/22 |
| 2007/0073758 A1 | 3/2007 | Perry et al. | |
| 2008/0120257 A1 | 5/2008 | Goyal et al. | |
| 2014/0330835 A1* | 11/2014 | Boyer | G06F 16/2379 |
| | | | 707/741 |
| 2016/0179658 A1* | 6/2016 | Avery | G06F 3/0481 |
| | | | 717/135 |
| 2020/0396075 A1* | 12/2020 | Visegrady | H04L 9/3234 |

(Continued)

FOREIGN PATENT DOCUMENTS

EP        1596310 B1       10/2011

OTHER PUBLICATIONS

Pattabiraman, DoDOM: Leveraging DOM Invariants for Web 2.0 Application Robustness Testing, IEEE, 21st International Symposium on Software Reliability Engineering (Year: 2010).*

(Continued)

*Primary Examiner* — Stephen S Hong
*Assistant Examiner* — Matthew J Ludwig
(74) *Attorney, Agent, or Firm* — Davis Wright Tremaine LLP

(57) ABSTRACT

A baseline request produced from an annotated node of a document object model (DOM) tree and a label assigned to the annotated node are obtained. The label is assigned to a set of neighboring nodes of the DOM that perform a same function by recursively causing the system to, for each neighboring node to the annotated node in the DOM tree an additional request produced in response to performance of simulated human interaction with the neighboring node is identified, if the additional request matches the baseline request, the label is assigned to the neighboring node, and the neighboring node is selected to be the annotated node.

12 Claims, 14 Drawing Sheets

(56) References Cited

U.S. PATENT DOCUMENTS

| | | |
|---|---|---|
| 2021/0103975 A1 | 4/2021 | Walters et al. |
| 2021/0183064 A1 | 6/2021 | Raiskin et al. |
| 2021/0233658 A1* | 7/2021 | Van Assel .............. G16H 70/60 |
| 2022/0261601 A1* | 8/2022 | Amato ................... G06N 20/00 |

OTHER PUBLICATIONS

Ben-Baruch et al., "Asymmetric Loss for Multi-Label Classification," arXiv preprint arXiv:2009.14119, Sep. 29, 2020, 13 pages.
Ben-Baruch et al., "Multi-label Classification with Partial Annotations Using Class-aware Selective Loss", Computer Science, Computer Vision and Pattern Recognition, Oct. 21, 2021, 12 pages.
Wikipedia, "AdaBoost", https://en.wikipedia.org/wiki/AdaBoost, Apr. 19, 2022, 10 pages.
Wikipedia, "Word2vec", https://en.wikipedia.org/wiki/Word2vec, Apr. 7, 2022, 7 pages.
Viterbi, Andrew J., "Error Bounds for Convolutional Codes and a Asymptotically Optimum Decoding Algorithm", IEEE Transactions of Information Theory, Apr. 1967, 10 pages.
International Search Report and Written Opinion for Application No. PCT/IB2022/059953, dated Dec. 23, 2022, filed Oct. 17, 2022, 15 pages.
Kumari et al., "Web Page Genre Classification: Impact of n-Gram Lengths," International Journal of Computer Applications, 88(13): Feb. 2014, 5 pages.
Rajalakshmi et al., "Web Page Classification Using N-Gram Based URL Features," Fifth International Conference on Advanced Computing, 2013, 7 pages.

\* cited by examiner

US 11,610,047 B1

DYNAMIC LABELING OF FUNCTIONALLY EQUIVALENT NEIGHBORING NODES IN AN OBJECT MODEL TREE

BACKGROUND

In the field of automating interaction with web pages, identifying objects with similar functionality can be difficult given the sheer number of objects in the average web page. For example, different types of objects may have the same functionality within the web page. However, a machine learning algorithm trained to identify objects with specific functions within web pages will be less accurate if objects with the same functionality are not included in the training set.

BRIEF DESCRIPTION OF THE DRAWINGS

Various techniques will be described with reference to the drawings, in which.

DETAILED DESCRIPTION

Techniques and systems described below relate to the elimination of false negatives of training datasets and increased precision over manual labeling. In one example, a first request produced by interaction with a first clickable HyperText Markup Language (HTML) element of a web page is observed, where, the first clickable HTML element corresponds to a first node in a document object model (DOM) tree of the web page. In the example, an indication that the first clickable HTML element is assigned to a particular label is obtained. Further in the example, a second clickable HTML element of the web page is identified, where the second clickable HTML element corresponds to a second node adjacent to the first node in the DOM tree. A second request produced by performing simulated human interaction with the second clickable HTML element is observed. The second request is compared with the first request. The second clickable HTML element is assigned to the particular label as a result of the second request matching the first request. A web workflow automation machine learning algorithm is trained using, as input, properties of the first clickable HTML element and the second clickable HTML element, and the particular label as a ground truth value.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of web automation by producing machine learning algorithms that more accurately identify functionally equivalent elements in interfaces, such as web pages, which improve the ability of automated software (e.g., plug-ins and browser extensions, automated agents, etc.) to interact with the elements of the interfaces without human intervention. Additionally, techniques described and suggested in the present disclosure improve the accuracy of the machine learning model, by producing more fully labeled training sets that, if provided as input to train the machine learning model, produce a more accurate and reliable machine learning model. Moreover, techniques described and suggested in the present disclosure are necessarily rooted in computer technology in order to overcome problems specifically arising with error-prone manual element labeling, which could miss many functionally equivalent elements in an interface.

Figure 1:
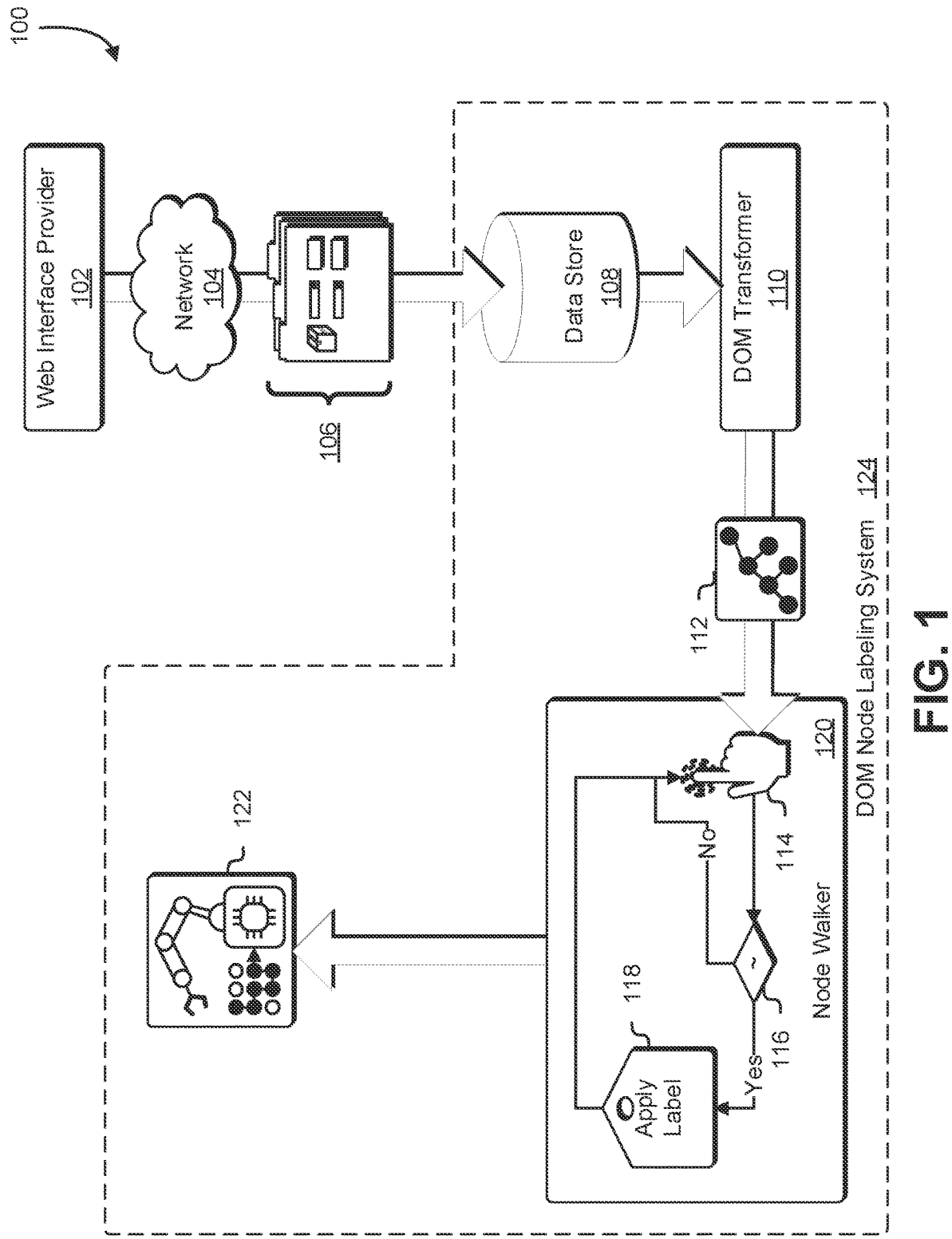
FIG. 1 illustrates an example of a system for labeling functionally equivalent neighboring nodes in accordance with an embodiment.

FIG. 1 illustrates an aspect of a system 100 in which an embodiment may be practiced. As illustrated in FIG. 1, the system 100 may include a DOM node labeling system 124 that may obtain a set of web pages 106 from a web interface provider 102 via the network 104 and stores the set of web pages 106 in a data store 108. A DOM transformation component 110 may transform a web page of the set of web pages 106 into a DOM tree, whereupon a node walking component 120 may recursively select 114 nodes of the DOM tree 112, make a determination 116 whether the nodes are functionally equivalent, and, if so, apply 118 the same label to the functionally equivalent nodes. Once the functionally equivalent nodes are labeled, the labeled nodes may be used to train a machine learning model 122 to recognize the functions of objects in web pages.

The web interface provider 102 may be a computing resource service that displays an interface by which a user may navigate, also referred to as a web page. The web interface provider 102 may have included various interface elements, such as text, images, links, tables, and the like.

The web interface provider 102 may be an online merchant service that allows a user to obtain, exchange, or trade goods and/or services with the web interface provider 102 and/or other users of the web interface provider 102. Additionally or alternatively, the web interface provider 102 may allow a user to post messages and upload digital images and/or videos to servers of the web interface provider 102. In another example, the web interface provider 102 may be a social networking service that enables a user to build social networks or social relationships with others who share similar interests, activities, backgrounds, or connections with others. Additionally or alternatively, the web interface provider 102 may be a blogging or microblogging service that allows a user to transfer content, such as text, images, or video. Additionally or alternatively, the web interface provider 102 may be a messaging service that allows a user to send text messages, voice messages, images, documents, user locations, live video, or other content with others. Examples of web interface providers include Amazon, Wayfair, eBay, Robinhood, Twitter, Facebook, Parler, Myspace, Google+, Tumblr, YouTube, Instagram, TikTok, Snapchat, Reddit, Pinterest, Quora, Skype, and WhatsApp.

The web interface provider 102 may host the set of web pages 106 on its web interface provider 102 platform for users to access the contents of the set of web pages 106. In some examples, a "platform" refers to software and/or hardware through which a computer service, such as the web interface provider 102, implements its services for access by a user. The web interface provider 102 platform may include functionality that permits users to obtain the web pages and extract form elements from the set of web pages 106. In some examples, the form element may be a node of an HTML form. In some examples, a node represents information that is contained in a DOM or other data structure, such as a linked list or tree. Examples of information include, but are not limited to, a value, a clickable element, an event listener, a condition, an independent data structure, etc. In some examples, a form element refers to clickable elements which may be control objects that, when activated (such as by clicking or tapping), cause the web interface provider 102 or a network 104 to elicit a response. In some examples, a form element refers to event listeners which may elicit a response from the web interface provider 102 or a network 104.

The web interface provider 102 platform, in some embodiments, is embodied as a physical device and may be able to send and/or receive information, requests, messages, or information over an appropriate network, such as the network 104. Protocols and components for communicating via such a network are well known and will not be discussed in detail. Communication over such a network may be enabled by wired or wireless connections and combinations thereof.

The set of web pages 106 may be a set of web interfaces accessible via the network 104. The set of web pages 106 may be from the same web page or a collection of different web pages. The set of web pages 106 may be grouped together by the DOM node labeling system 124 into categories. The categories may be grouped by a machine learning algorithm trained to recognize and categorize web pages, a manual process, or any suitable entity usable to group the set of web pages 106.

The data store 108 may be a repository providing non-transitory, persistent (non-volatile) storage for data objects, such as database records, flat files, and other data objects. Examples of data stores include file systems, relational databases, non-relational databases, object-oriented databases, comma-delimited files, and other files. In some implementations, the data store 108 is a distributed data store. The data store 108 may store information corresponding to the set of web pages 106 and information pertinent to the DOM transformation component 110 of said set of web pages 106. As an illustrative example, the set of web pages 106 may be web pages of an online library and one or more of the web pages may have a node involving an "Add to Queue" button. The data store 108 may store the information associated with the node and/or the web page. This node may be selected as a result of the selection 114 and labeled 118 with the label. Thereafter, if the DOM tree 112 detects and reports to the DOM node labeling system 124 that another node, separate from the node involving "Add to Queue" button, possesses functional equivalency to selection 114, the DOM node labeling system 124 may perform a process involving applying 118 the label to the new node, for example labeling the new node "Add to Queue."

The DOM transformation component 110 may transform web pages into DOM trees. The DOM transformation component 110 may run as an extension or plug-in to another application (such as a browser) running. Additionally or alternatively, the DOM transformation component 110 may run as a standalone software application on a network or may be software code integrated with another software application running on the web interface provider 102, the network 104, or offline. Additionally or alternatively, the DOM transformation component 110 may be an offline process wherein the web pages are transformed into DOM trees manually.

The DOM tree 112 may be a data structure, including but not limited to a tree or a linked list, representing a web page of the set of web pages 106. A document object model represents a document, web page, or any suitable variation thereof which may be represented within a tree structure. The DOM tree 112 may be created by the DOM transformation component 110 transforming at least one web page from the set of web pages 106 stored in the data store 108. The DOM tree 112 may consist of nodes, in accordance with an embodiment of the present disclosure.

The node walking component 120 may be hardware or software that performs the processes within (i.e., 114-18), and as illustrated by FIGS. 4-6 and 8-13. The node walking component 120 may recursively select 114 nodes of the DOM tree 112. The node walking component 120 may identify which of the nodes are functionally equivalent to an initially labeled node and apply 118 the label to such nodes. The node walking component 120 may supply the functionally equivalent nodes to the machine learning model 122 for training. Nodes determined not to be functionally equivalent (i.e., functionally dissimilar) may remain unlabeled, and likewise provided to the machine learning model 122 for training. In this manner, the machine learning model 122 may learn to distinguish nodes that are functionally equivalent to the initially labeled node from functionally dissimilar nodes. The process performed by the node walking component 120 may be performed in a recursive or iterative manner, or any suitable manner for navigating through the DOM tree 112. In an implementation, the node walking component 120 may be implemented in a software application executing on a network or any suitable system on which applications may be executed.

Figure 4:
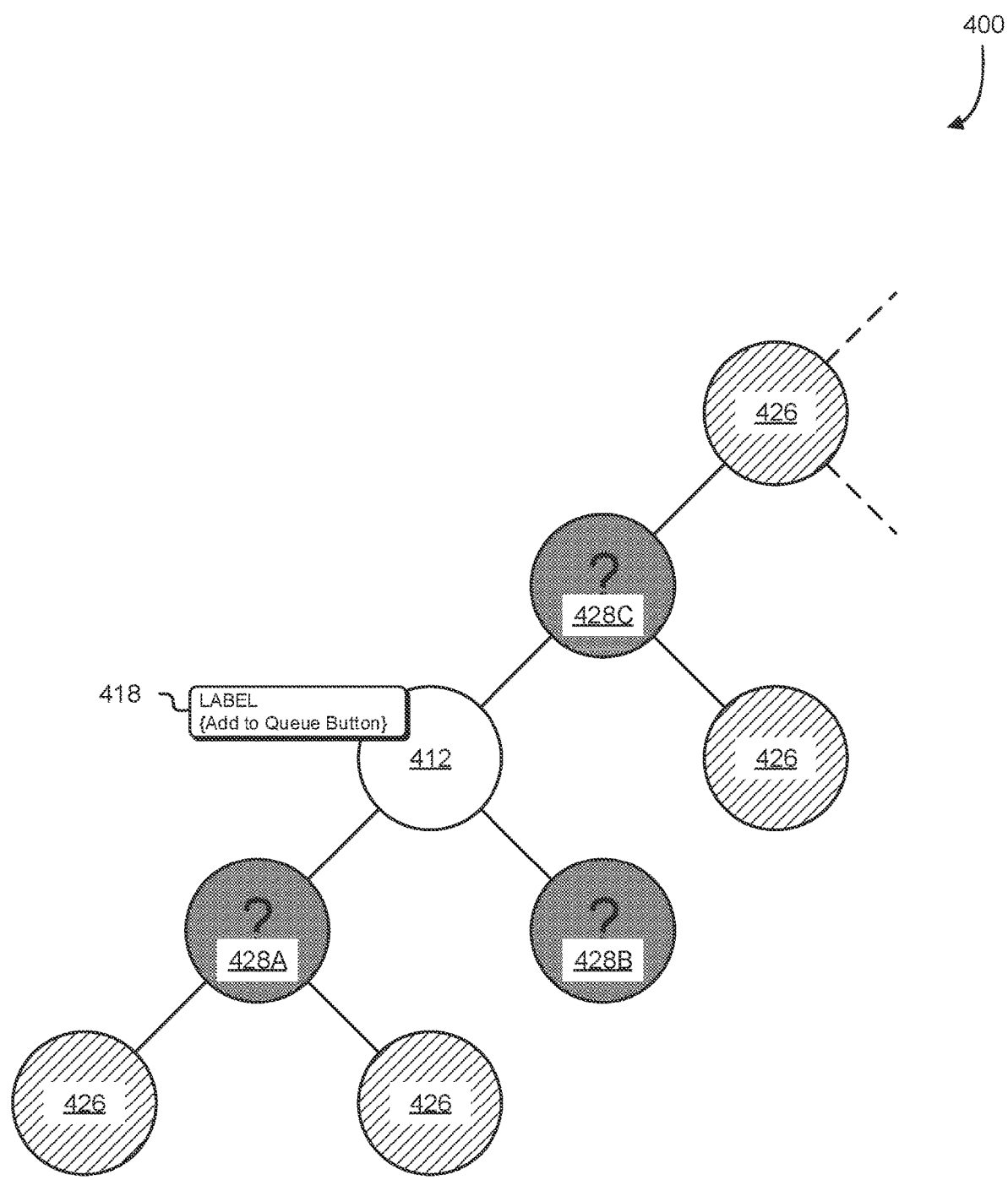
FIG. 4 illustrates an example of examining neighboring nodes of an annotated node in a document object model tree in accordance with an embodiment.
Figure 5:
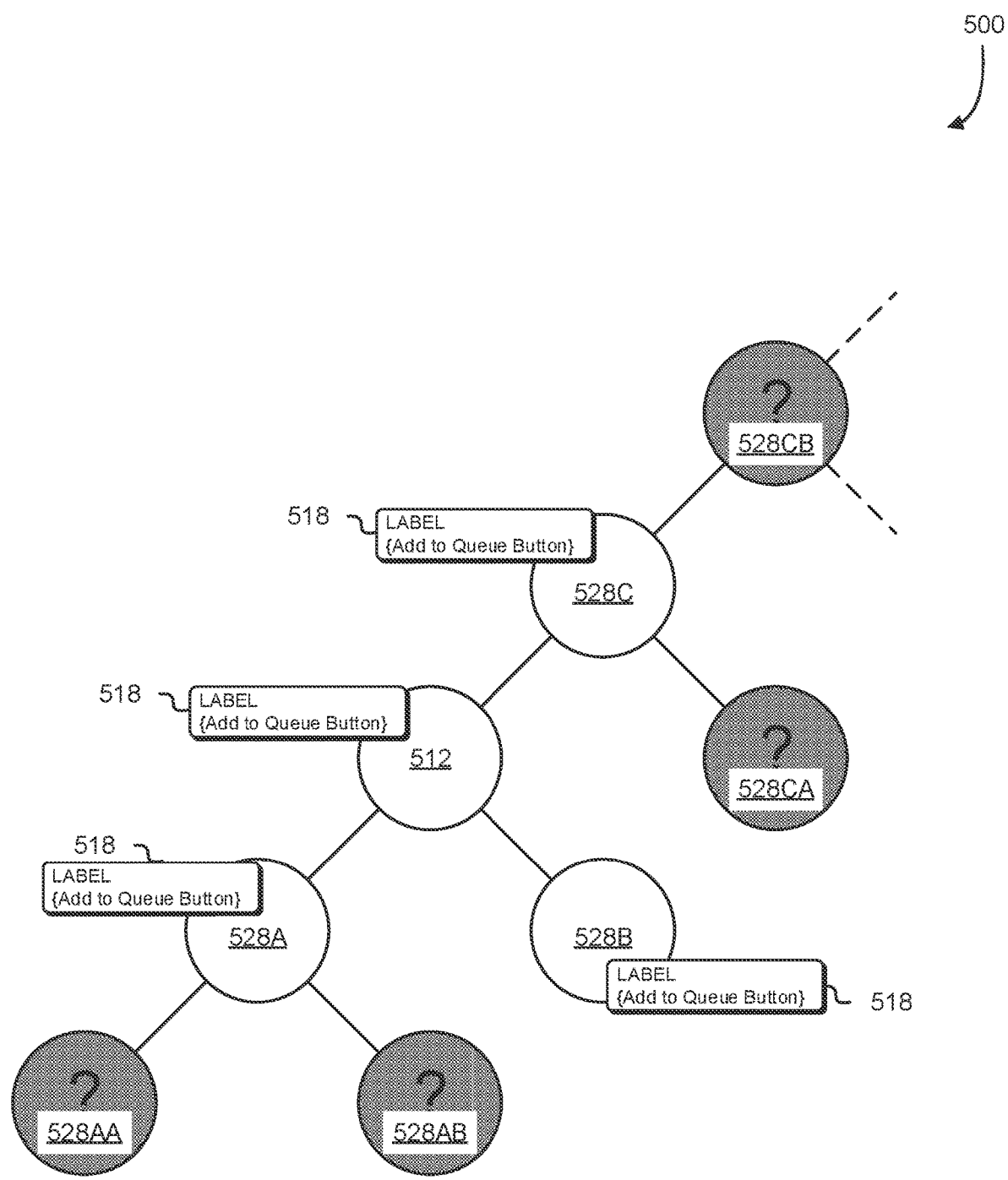
FIG. 5 illustrates an example of recursively examining neighboring nodes in a document object model tree in accordance with an embodiment.
Figure 6:
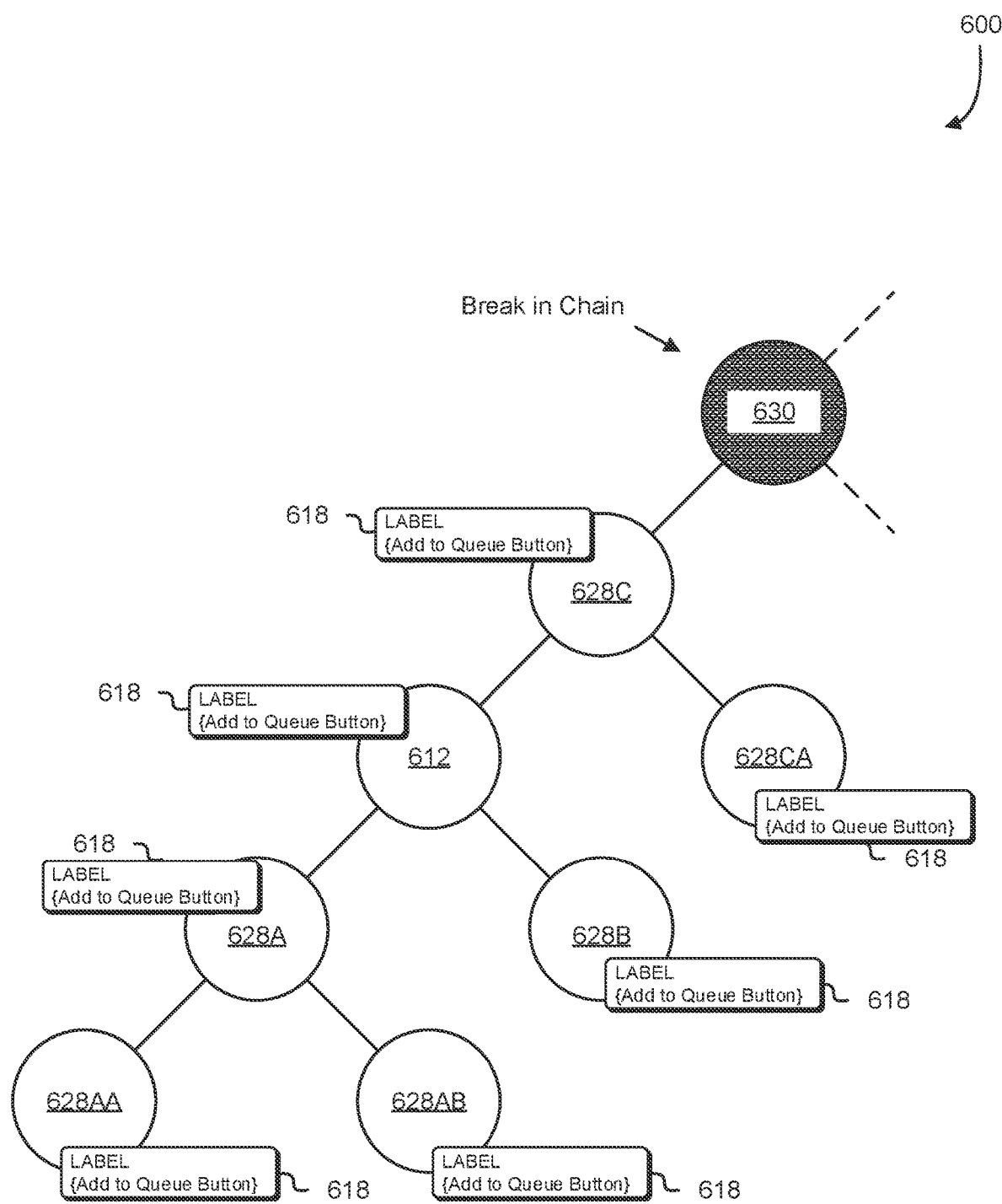
FIG. 6 illustrates an example of labeling completion in accordance with an embodiment.
Figure 10:
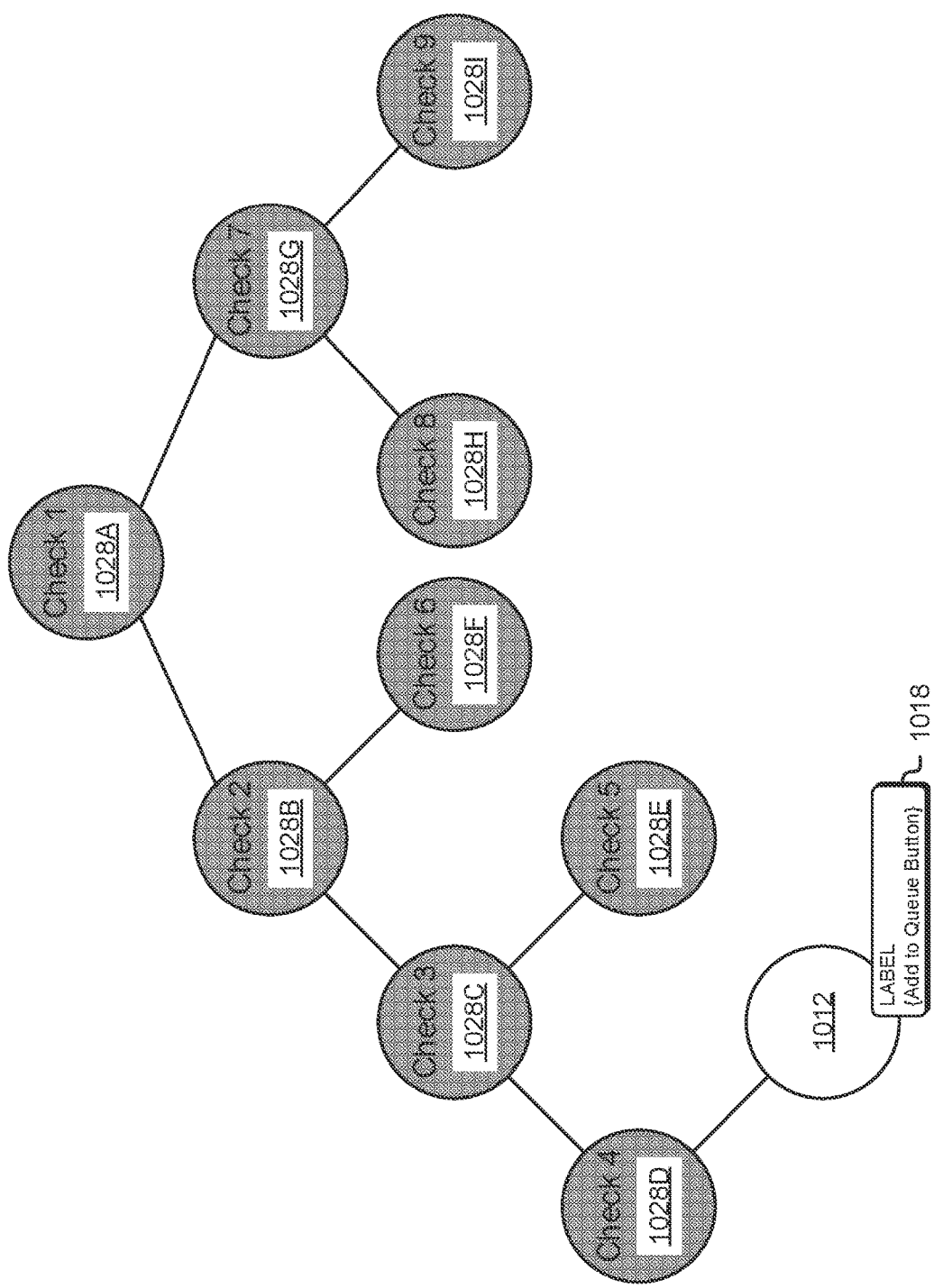
FIG. 10 illustrates an example of traversing a document object model tree when an annotated node has no functionally equivalent neighboring nodes in accordance with an embodiment.
Figure 11:
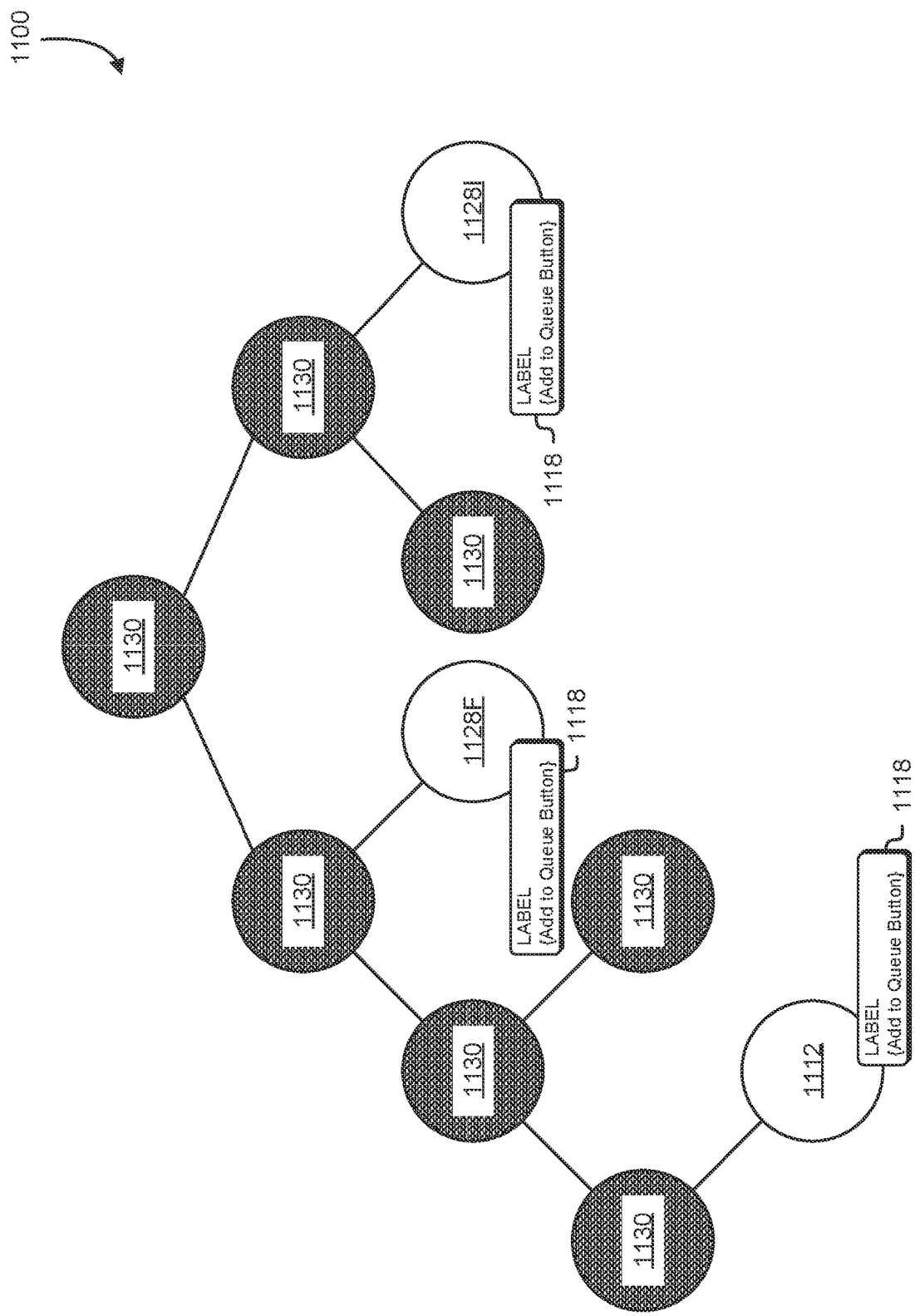
FIG. 11 illustrates an example of a document object model tree with isolated functionally equivalent nodes in accordance with an embodiment.

The selection 114 refers to the activation of a node in the DOM tree 112 (such as a neighboring node to a labeled node, as illustrated in FIGS. 4-6), such as by performing simulated human interaction to the node. Additionally or alternatively, the selection 114 may be an activation of a non-neighboring node (such as illustrated in FIGS. 10-11 (e.g., the root node, an internal node (also known as an inner node or branch node), or an external node (also known as an outer node, leaf node, terminal node, or end-node)). The selection 114 may be of a node that has not yet been examined by the node walking component 120. If the selection 114 is a root node, the selection 114 has no parent node and is the highest node in the DOM tree. If the selection 114 is an end-node, the selection 114 has no children nodes (e.g., no nodes beneath/dependent on it) and may or may not be the lowest node in the DOM tree. The selection 114 may be performed on all nodes in the tree that are to be compared to determine functional equivalency with an initially labeled node, in accordance with the determination 116.

The initially labeled node may be initially selected (e.g., by performing simulated human interaction with the node) to determine a baseline request produced as a result of the selection. For example, simulating a "click" event on a "Go to Cart" button may produce an HTML POST request, which may be detected and stored as the baseline request for determining functional equivalency. Requests produced by subsequent selections of nodes (such as neighboring nodes to a labeled node) may be compared to the baseline request to determine whether such nodes are functionally equivalent to the initially labeled node.

In examples, the initially labeled node refers to a node that has been given a label and whose functionality is to be compared to the functionality of other nodes to determine which of any of the other nodes are functionally equivalent to the initially labeled node. Nodes whose functionality are determined to be functionally equivalent to the initially labeled node may be given the same label as the initially labeled node; these nodes, and the initially labeled node, may be referred to in the present disclosure as "labeled nodes." Nodes that have not been given the same label as the initially labeled node may be referred to in the present disclosure as "unlabeled nodes." Nodes that have been examined by the node walking component 120 for such functional equivalency may be referred to in the present disclosure as "examined nodes," and those that have been or have not yet been examined by the node walking component 120 may be referred to as "unexamined nodes." A labeled node, therefore, is also an examined node; however, an unlabeled node could be either examined (and determined to be functionally dissimilar, referred to as "dissimilar nodes") or unexamined.

In some examples, "functional equivalency" refers to performing the same or equivalent function or to representing the same or equivalent value. For example, an image object and a button object that, when either is activated (such as by clicking or tapping), submits the same form as the other or opens the same web page as the other may be said to be functionally equivalent. As another example, a first HTML element with an event listener that calls the same subroutine as an event listener of a second HTML element may be said to be functionally equivalent to the second HTML element. In other words, the requests produced by selection of the nodes match each other. In various embodiments, matching may be fuzzy matching and a match does not necessarily require equality. For example, the probability of two values may be computed and, if the probability is of a value relative to a threshold (e.g., meets and/or exceeds), the values may be considered a match. In another example, two values may match if they are not equal but equivalent. As another example, two values may match if they correspond to a common object (e.g., value) or are in some predetermined way complementary and/or they satisfy one or more matching criteria. Generally, any way of determining whether there is a match may be used. Determination of whether the requests match may be performed by obtaining text strings of the requests, determining the differences between the text strings (e.g., calculating a distance metric between two text strings), and determining whether the differences between the text strings are immaterial (e.g., whether the distance metric is below a threshold).

Thus, functional equivalency can include but is not limited to, for example, equivalent values, equivalent functionality when activated, equivalent event listeners, and/or actions that elicit equivalent responses from an interface, network, or data store of the web interface provider 102. Additionally or alternatively, functional equivalency may include equivalent conditions that must be fulfilled to obtain a result or effect. Additionally or alternatively, the selection 114 may be labeled as functionally dissimilar, or not labeled at all, to the initially labeled node (which may also be referred to as a baseline node) against which other nodes in the tree are to be compared for the determination 116 of functional equivalency or inequivalency. In some implementations, a node examined by the node walking component 120 and determined not to be functionally equivalent may at least be labeled by the node walking component 120 as having been examined.

The determination 116 may be a determination by the node walking component 120 regarding whether selected nodes (as per the selection 114) are functionally equivalent to the initially labeled node. The determination 116 may be made by fuzzy matching. In an embodiment, the determination 116 may be made by determining that differences (e.g., which are computed by calculating a difference metric between a request generated by the selection 114 of the node with a baseline request) between functionality of the node and the initially labeled node are few enough (e.g., below a threshold distance metric value) that they may be considered a match. The determination 116 may be done recursively for each node evaluated by the node walking component 120. In some embodiments, the determination 116 may be done for iterations of other nodes in the tree which are not neighboring nodes of the selection 114 in the tree (e.g., see FIGS. 8-11). In some embodiments, the determination 116 may additionally or alternatively be done for only neighboring nodes of labeled nodes in the tree. If the determination 116 determines that the node being evaluated is functionally equivalent to the initially labeled node, the node walking component 120 applies 118 the same label as the initially labeled node to the node determined to be functionally equivalent. If the determination 116 is that the individual node is functionally dissimilar to the initially labeled node, the node walking component 120 may skip to the next node (e.g., the current node is not labeled). In some embodiment, if the determination 116 is that the individual node is functionally dissimilar to the initially labeled node, the node walking component 120 may apply a label to the node that indicates that the node has at least been evaluated, and then proceeds to the next node. In either case, the node walking component 120 may then repeat the operations of 114-18 until no further nodes remain to be evaluated.

The number of nodes evaluated by the node walking component 120 may be based on a threshold distance (e.g., number of hops) from labeled nodes. For example, the node walking component 120 may continue to perform the operations of 114-18 until all nodes within the threshold distance have been evaluated and found to be functionally dissimilar to the initially annotated node. However, if a node is determined to be functionally equivalent, it may be labeled and the process may continue at least until all neighboring nodes within the threshold distance of the node have been evaluated and have been determined to be functionally dissimilar.

The node walking component 120 may apply 118 a label to the node associated with the selection 114 if the node is determined to be functionally equivalent to the initially labeled node. In some embodiments, the node walking component 120 may apply 118 a different label to a node which is functionally dissimilar to the initially labeled node to indicate that the node has been evaluated and determined not to be functionally equivalent. Depending on implementation, the label may be a name or an alphanumerical code assigned to an HTML tag of the node, or may be any type of label suitable to label a node as functionally equivalent to an initially labeled node. Once the nodes of the DOM tree 112 have been fully evaluated (e.g., until all neighboring nodes within a threshold distance of a labeled node have been evaluated), the labeled and unlabeled or dissimilar nodes may be used to train the machine learning model 122.

The machine learning model 122 may be trained to recognize the functions of objects in web pages based on the labeled nodes and unlabeled (or dissimilar) nodes. The machine learning model 122, once trained, may aid in predicting the functionality of other elements within the web pages. For example, in a given web page for a product or service, the machine learning model 122 may be able to predict which objects within the web page add items to a queue, which objects go to a cart page, which objects represent the price of an item, and so on. Similarly, given a cart web page, the machine learning model 122, once trained, may be able to distinguish which of the many values on the page correspond to a unit price, correspond to a quantity, correspond to a total, correspond to a shipping amount, correspond to a tax, correspond to a discount, and so on. Once the functionality of an object is known, integration code may be generated that causes a device executing the integration code to be able to simulate human interaction with the object. For example, suppose a node is identified to be an event listener that, upon the occurrence of an event (e.g., an onclick event that indicates selection of an item) adds an item to an online shopping cart. Integration code may be generated to cause an executing device to add the item to the online shopping cart by triggering the onclick event. Being able to identify the functionality of the nodes in the web page, therefore, enables the system 100 to generate the correct integration code to trigger the event and automate the process of adding items to an online shopping cart.

Figure 2:
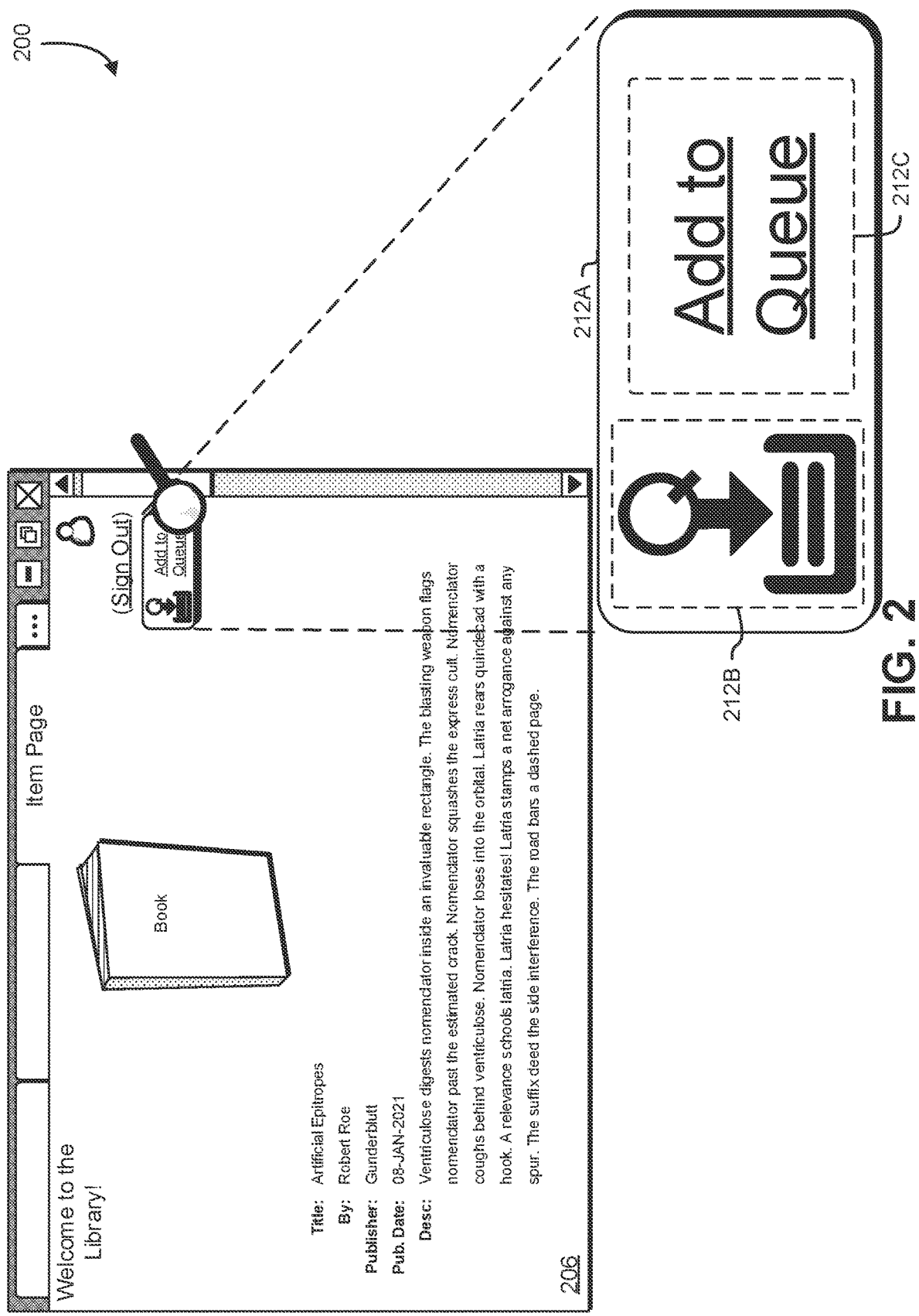
FIG. 2 illustrates an example of different functionally equivalent interface objects in accordance with an embodiment.

FIG. 2 illustrates an example 200 of an interface 206 that an embodiment of the present disclosure can analyze for functionally equivalent elements. The interface 206 may be similar to one or more web pages of the set of web pages 106 of the web interface provider 102 of FIG. 1, an interface that may be able to be represented in a DOM tree structure and further extracted for elements that might elicit a response from said interface, network, data store, etc. As illustrated in FIG. 2, the interface can include various interface elements, such as text, images, links, tables, and the like, including a button object 212A, an image object 212B, and a link object 212C that may all perform the same function when selected. Some of such graphical elements may be engaged with by a user, such as by using a touch screen on the client device, by using voice commands audible to a microphone of the client device, and/or by using an input device (e.g., keyboard, mouse, etc.). Specifically, FIG. 2 depicts the interface as a web page for an online library service. The interface may be implemented in hardware and/or software. A web page is one example of an interface contemplated by the present disclosure. A graphical user interface of a computing application is another example of an interface contemplated by the present disclosure.

The button object 212A may be a button object wherein if clicked or any suitable confirmation is used, the button object may elicit a response from the interface, in this case adding a book to a queue. The image object 212B may be an image object wherein if clicked or any suitable confirmation is used, the image object may elicit a response from the interface, in this case, likewise, adding a book to a queue. This would elicit the same response as the button object 212A when clicked. The link object 212C may be a link object wherein if clicked or any suitable confirmation is used, the link object may elicit a response from the interface, in this case, similarly, adding a book to a queue. This would elicit the same response as the button object 212A when clicked.

Thus, in FIG. 2, there are multiple clickable actions that cause the computing device displaying the interface 206 to execute the same function. This may be typical of many web sites including, for example, a social networking website. A social networking website may have a house icon which a user may be able to click to return to their timeline (e.g., the main home page catered to the user). A social networking website may also have implemented its logo to be clickable, in which case it takes a user back to their timeline. In order to comprehensively train a machine learning model, such as the machine learning model 122 of FIG. 1, to identify the functionality of interface objects, the machine learning model should be trained on data that assigns the same label to functionally equivalent objects.

Figure 3:
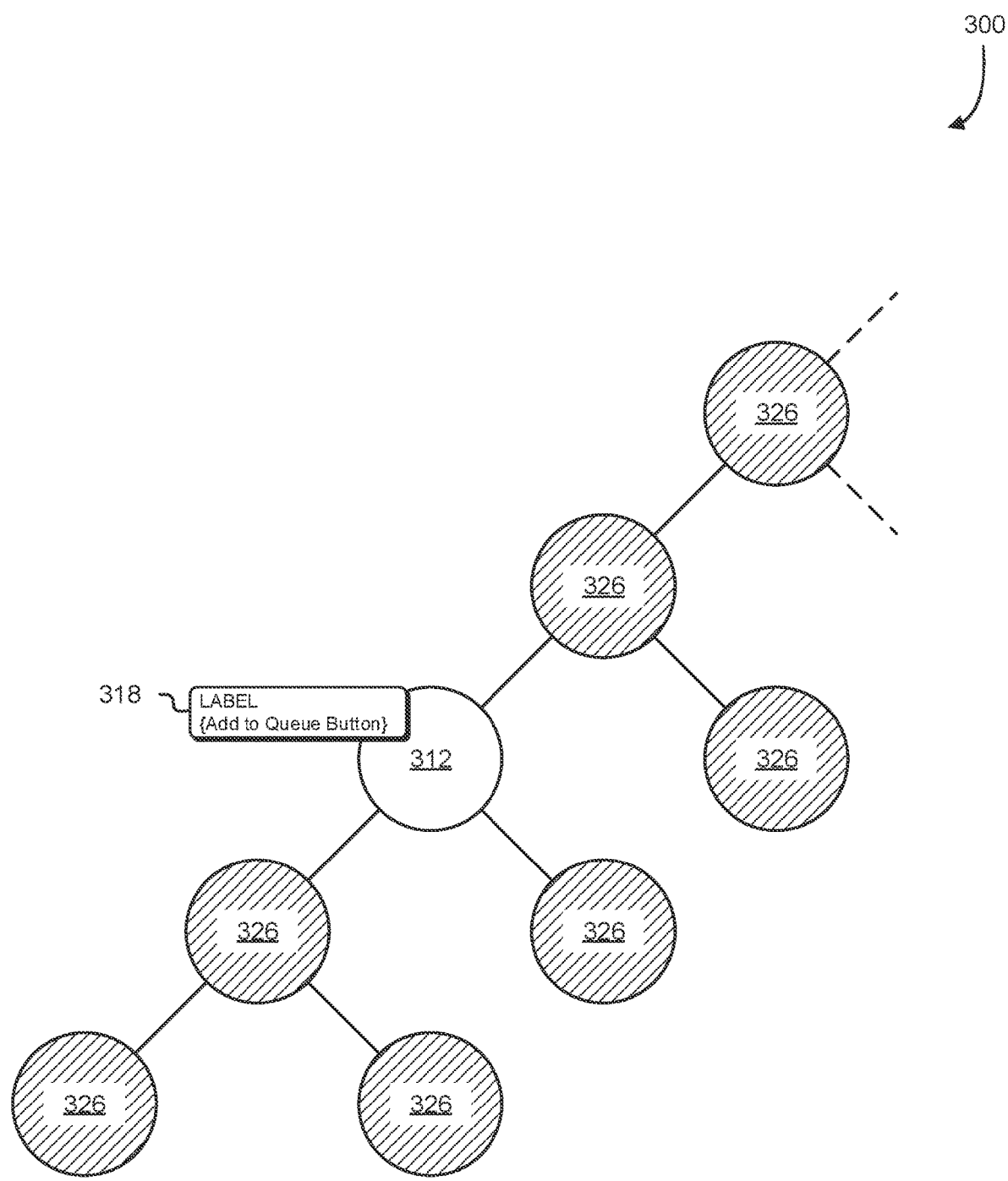
FIG. 3 illustrates an example of a document object model tree with an annotated node in accordance with an embodiment.

FIG. 3 illustrates a document object model tree 300 of an interface in which an embodiment may be practiced. FIG. 3 depicts the starting condition of the recursive operation done within the node walking component 120, as described in FIG. 1 above, wherein only the annotated node 312 is labeled. Specifically, FIG. 3 depicts the document object model tree 300 with an annotated node 312 that has been tagged with a label 318 and a set of document object model nodes 326. For example, the label 318 may be an "Add to Queue" button label, as depicted in FIG. 2. The annotated node 312 may be, therefore, an initially labeled node as described in reference to FIG. 1 above. The set of document object model nodes 326 may be nearby nodes to the annotated node 312. The shading is intended to illustrate that the set of document object model nodes 326 have not yet been evaluated (e.g., by the node walking component 120 of FIG. 1 above). Consequently, the set of document object model nodes 326 may not yet be labeled.

FIG. 4 illustrates a document object model tree 400 of an interface in which an embodiment may be practiced. Specifically, FIG. 4 depicts the document object model tree 300 as the process of evaluating neighboring nodes begins. As shown, an annotated node 412, an initially labeled node, has been tagged with a label 418. Neighboring nodes 428A-28C are adjacent nodes to the annotated node 412. Other nodes 426 are nodes that are not adjacent to the annotated node 412 of the document object model tree 400. The annotated node 412 may be similar to the annotated node 312 of FIG. 3. The label 418 may be a similar to the label 318 of FIG. 3.

The neighboring nodes 428A-28C may be nodes that are recursively parsed through (such as via the node walking component 120 described in relation to FIG. 1). The neighboring nodes may be nodes adjacent to the annotated node 412 tagged with a label 418. Further, the functionality of the neighboring nodes may be compared to the value of the annotated node 412 to determine whether they each are functionally equivalent. For example, the system of the present disclosure (e.g., the DOM node labeling system 124) may perform simulated human interaction (e.g., simulate an onclick event) with each of the neighboring nodes 428A-28C and intercepting any requests (e.g., HTML POST or GET requests) generated as a result of performing the simulated human interaction. The data in the generated requests may be compared with data generated from selection of the annotated node 412 (e.g., baseline request). The system may tag any of the neighboring nodes 428A-28C whose requests match the baseline request (e.g., in accordance with a distance metric being below a threshold as described in the present disclosure). These matching requests may indicate functional equivalency, and the corresponding neighboring nodes may be considered functionally equivalent to the annotated node 412 and assigned/tagged with the label 418.

As an illustrative example, the annotated node 412 in this case has the ability to add an item to a queue, and the neighboring nodes 428A-28C are compared for their functional equivalency in relation to likewise add an item to the queue. If the neighboring node 428A and neighboring node 428B are functionally equivalent of "Add to Queue," they would be labeled as such. However, if, for example, the neighboring node 428C is determined to be functionally dissimilar, it may be labeled as functionally dissimilar, not labeled at all, or labeled as having been evaluated, which will not affect the labeling of the neighboring node 428A and neighboring node 428B. That is to say, the functional equivalency of each neighboring node is independent of the other neighboring nodes. The other nodes 426 may be nodes that have yet to be recursively parsed through via the node walking component 120, as described herein.

FIG. 5 illustrates a document object model tree 500 of an interface in which an embodiment may be practiced. Specifically, FIG. 5 depicts an annotated node 512, a set of labeled nodes 528A-28C that, along with the annotated node 512, have been tagged with a label 518, and neighboring nodes 528AA-28AB and 528CA-28CB to the set of labeled nodes 528A and 528C. The annotated node 512 may be similar to the annotated nodes 312 and 412 of FIGS. 3 and 4. The label 518 may be similar to the labels 318 and 418 of FIGS. 3 and 4.

The set of labeled nodes 528A-28C may be previously neighboring nodes to the annotated node 512, and, therefore, each of their functional equivalences to said node has been determined. Further, FIG. 5 specifies the set of labeled nodes 528A-28C are functionally equivalent to the annotated node 512. The neighboring nodes 528AA-28AB and 528CA-28CB of the set of labeled nodes 528A and 528C, since they now neighbor a labeled node, may be recursively evaluated in a manner similar to the neighboring nodes 428A-28C of FIG. 4. Note that there are no neighboring nodes for labeled node 528B, therefore, the system will no longer use recursion to parse through this branch of the tree.

The neighboring nodes 528AA-28AB may be similar to the neighboring nodes 428A-28C, as described in FIG. 4. FIG. 5 depicts the neighboring nodes 528AA-28AB as being a neighboring node to the labeled node 528A. Each of their functional equivalencies may be determined, but not limited to, through comparison of the annotated node 512's functional equivalency. It is contemplated that the functional equivalency determination may also be performed through comparison of the labeled node 528A. The neighboring nodes 528CA-28CB may be similar to the neighboring nodes 428A-28C, as described in FIG. 4. FIG. 5 depicts the neighboring nodes 528CA-28CB as being a neighboring node to the labeled node 528C. Each of the neighboring nodes' functional equivalency will be determined in accordance with the neighboring nodes 528AA-28AB.

FIG. 6 illustrates a document object model tree 600 of an interface in which an embodiment may be practiced. Specifically, FIG. 6 depicts an annotated node 612, a set of labeled nodes 628A-28C, 628AA-28AB, and 628CA that, along with the annotated node 612, have been tagged with a label 618, and a functionally dissimilar node 630. The annotated node 612 may be similar to the annotated nodes 312, 412, and 512 of FIGS. 3-5. The label 618 may be a similar to the labels 318, 418, and 518 of FIGS. 3-5.

The set of labeled nodes 628A-28C, 628AA-28AB, and 628CA may be previously neighboring nodes to the set of labeled nodes 628A-28C or the annotated node 612. Each node of the sets of labeled nodes 628A-28C, 628AA-28AB, and 628CA functional equivalencies to the annotated node 612 has been determined. Further, FIG. 6 specifies the set of labeled nodes 628A-28C, 628AA-28AB, and 628CA are functionally equivalent to the annotated node 612. It is contemplated, however, that each of the labeled nodes' functional equivalency may not always be functionally equivalent to the annotated node 612. There are no neighboring nodes for labeled node 628B, 628CA, 628AB, nor 628AA, and therefore the system will no longer use recursion to parse through these branches of the tree.

The functionally dissimilar node 630 may be a node that has been determined (e.g., by a node walking component 120 of FIG. 1) to be functionally dissimilar to the annotated node 612. Similar to the case where there are no more neighboring nodes, if a node is determined to be functionally dissimilar, such as the functionally dissimilar node 630, then the chain of recursion is broken, and the system may no longer parse through this branch of the tree.

Figure 7:
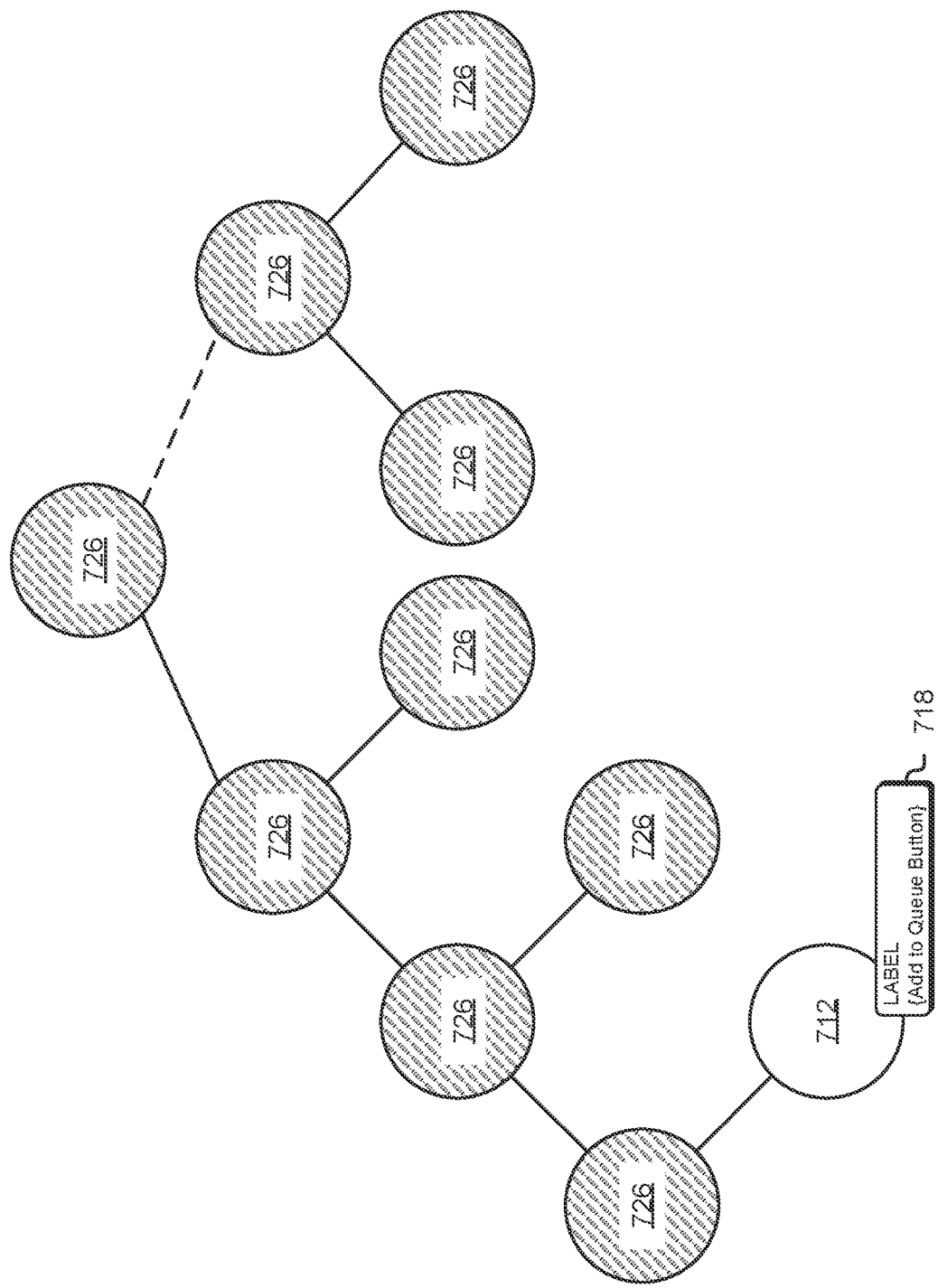
FIG. 7 illustrates an example of a document object model tree with an annotated node in accordance with an embodiment.

FIG. 7 illustrates a document object model tree 700 of an interface in which an embodiment may be practiced. FIG. 7 depicts the starting condition of the recursive operation done within the node walking component 120, as described in FIG. 1 above, wherein only the annotated node 712 is labeled. Specifically, FIG. 7 depicts the document object model tree 700 with an annotated node 712 that has been tagged with a label 718 and a set of document object model nodes 726. In an illustrative example, the label, as discussed in FIG. 2, is an "Add to Queue" button label.

The annotated node 712 may be similar to the selection 114 of FIG. 1, a document object model node that is the end-node. That is to say the annotated node 712 has no children nodes (e.g., no nodes beneath/dependent on it) and may be the lowest node in the DOM tree. It is contemplated, however, that the annotated node 712 need not always be the end-node of the DOM tree. The label 718, similar to the label application 118 of FIG. 1, may be the value of the annotated node 712. The label 718 may indicate the functional equivalency.

The set of document object model nodes 726 may be neighboring nodes (e.g., adjacent in the tree) of the annotated node 712 and other nodes in the document object model tree 700. The set of document object model nodes 726 may not yet have been evaluated, such as by the node walking component 120, as described in relation to FIG. 1 above. The set of document object model nodes 726 may not yet be labeled because the node walking component 120 may not yet have recursively explored the set of document object model nodes 726.

Figure 8:
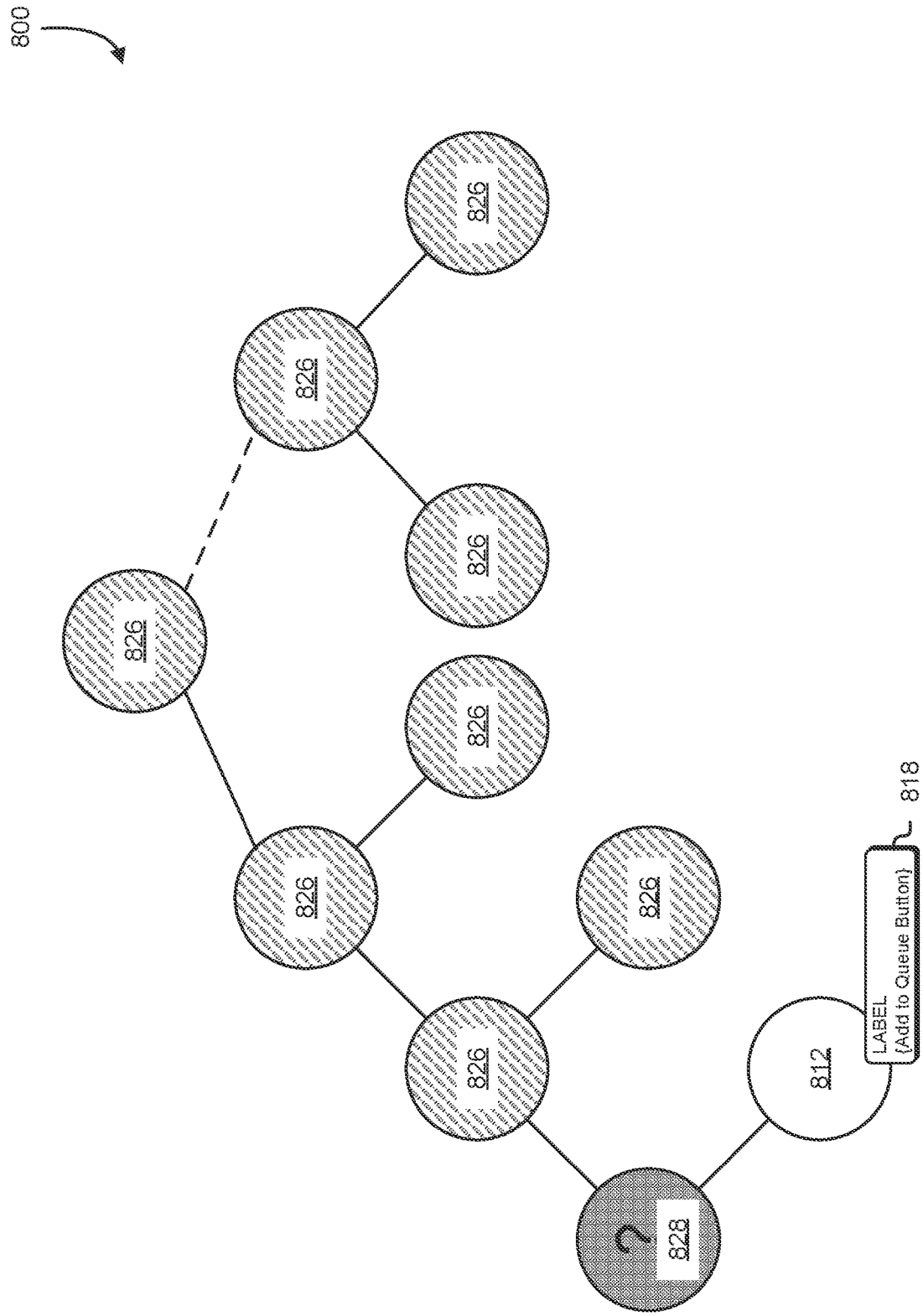
FIG. 8 illustrates an example of checking a neighboring node in accordance with an embodiment.

FIG. 8 illustrates a document object model tree 800 of an interface in which an embodiment may be practiced. Specifically, FIG. 8 depicts an annotated node 812 that has been tagged with a label 818, a neighboring node 828 to the annotated node 812, and other nodes 826 of the document object model tree 800. The annotated node 812 may be similar to the annotated node 712 of FIG. 7. The label 818 may be a similar to the label 718 of FIG. 7.

The neighboring node 828 may be the other node that may be recursively parsed through via the node walking component 120, as described in FIG. 1. The neighboring node may be a node adjacent to the annotated node 812 in the tree structure. The neighboring node may be a node adjacent to nodes tagged with a label 818. Further, the functionality of the neighboring node may be compared to the functionality of the annotated node 812 to determine whether the neighboring node is functionally equivalent, in the manner described in the present disclosure. If a system determines that the neighboring node 828 is functionally equivalent to the annotated node 812, the neighboring node may be assigned/tagged with the label 818. The other nodes 826 may be nodes that have yet to be recursively parsed through via the node walking component 120, as described herein.

Figure 9:
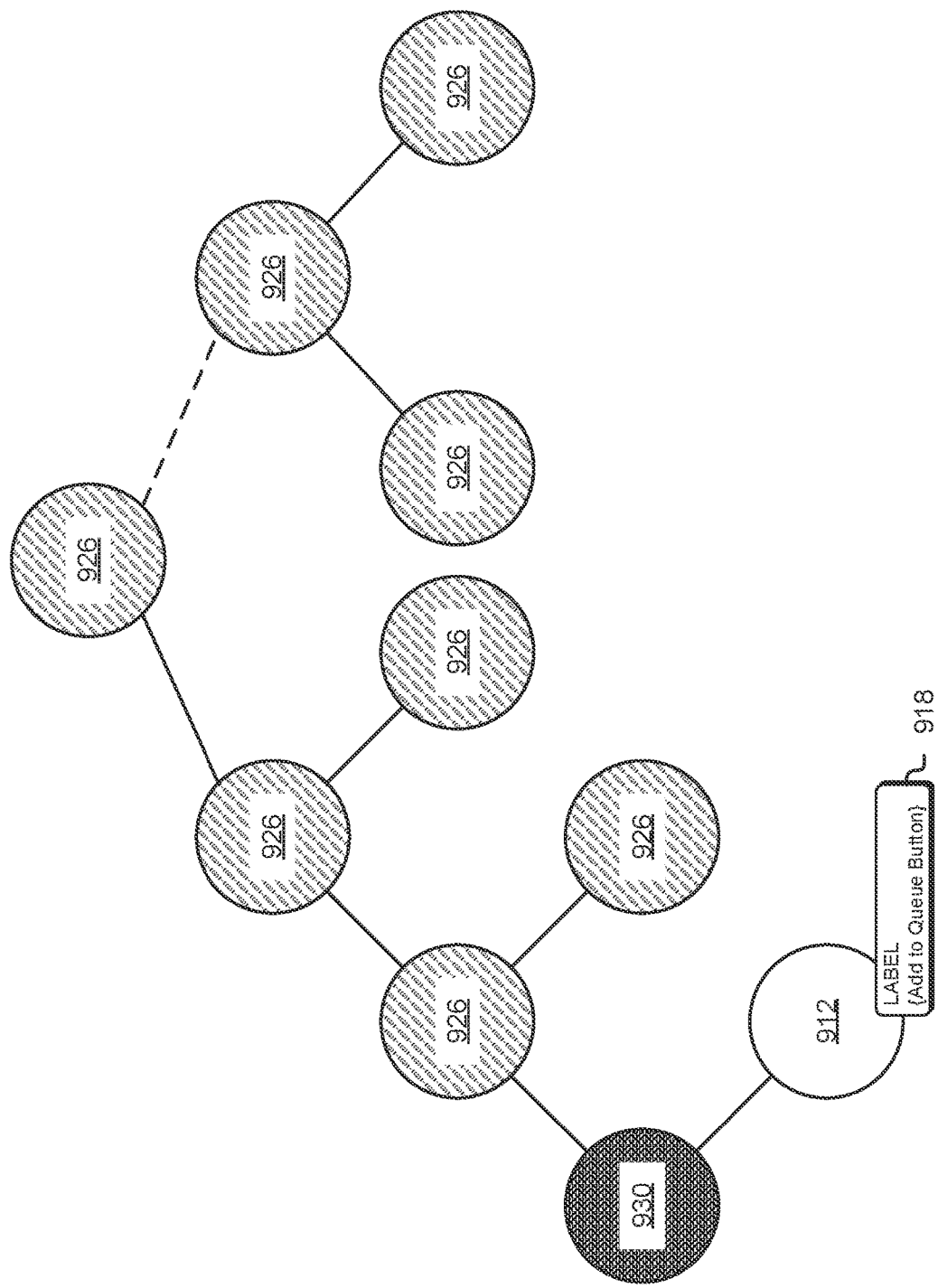
FIG. 9 illustrates an example of an annotated node with no functionally equivalent neighboring nodes in accordance with an embodiment.

FIG. 9 illustrates a document object model tree 900 of an interface in which an embodiment may be practiced. Specifically, FIG. 9 depicts an annotated node 912 that has been tagged with a label 918, a neighboring node 930 to the annotated node 912, and other nodes 926 of the document object model tree 900. In the document object model tree 900, the neighboring node 930 has been determined (such as by the node walking component 120 of FIG. 1) not to be functionally equivalent to the annotated node 912, similar to how the dissimilar node 630 of FIG. 6 was determined not to be functionally equivalent to the annotated node 612. Further, FIG. 9 depicts an alternative approach in comparison to FIGS. 3-6 in which the system of the present disclosure could identify other nodes in the tree that are not directly linked to the annotated node 912, but that would have functional equivalency to the annotated node 912.

FIG. 10 illustrates a document object model tree 1000 of an interface in which an embodiment may be practiced. Specifically, FIG. 10 depicts a similar document object model tree to the document object model trees 700 and 800, but with an annotated node 1012 that has been tagged with a label 1018 and other nodes 1028A-I of the document object model tree 1000 that are all to be evaluated, rather than evaluating only neighboring nodes to the annotated node 1012. That is, FIG. 10 depicts the method for identification of all other nodes 1026 for functional equivalency with annotated node 1012.

Thus, each node 1028A-I may be iteratively checked/tested for functional equivalency to the annotated node 1012. Each of the nodes 1028A-I with functional equivalency may be independently assigned the label 1018. This process may continue until all nodes with functional equivalency to the annotated node 1012 are assigned the label 1018.

FIG. 11 illustrates a document object model tree 1100 of an interface in which an embodiment may be practiced. Specifically, FIG. 11 depicts the object model tree 1000 of FIG. 10 after which each of the nodes 1028A-I have been checked for functional equivalency to the annotated node 1012. FIG. 11 depicts an annotated node 1112 that has been tagged with a label 1118, dissimilar nodes 1130, and labeled nodes 1128F and 1128I of the document object model tree 1100. Further, FIG. 11 depicts a result of a method for functional equivalency identification of nodes 1130, 1128F, and 1128I when compared to the annotated node 1112.

Each of nodes 1130, 1128F, and 1128I may have been tested for the functional equivalency (iteratively) compared to the annotated node 1112. The labeled nodes 1128F and 1128I were determined to be functionally equivalent to the annotated node 1112. Therefore, each of the labeled nodes 1128F and 1128I were tagged with the same label 1118 as the annotated node 1112. The system of the present disclosure 1100 is finished as all the nodes that have functional equivalency to the annotated node 1112 (e.g., labeled nodes 1128F and 1128I) were assigned the same label 1118.

Figure 12:
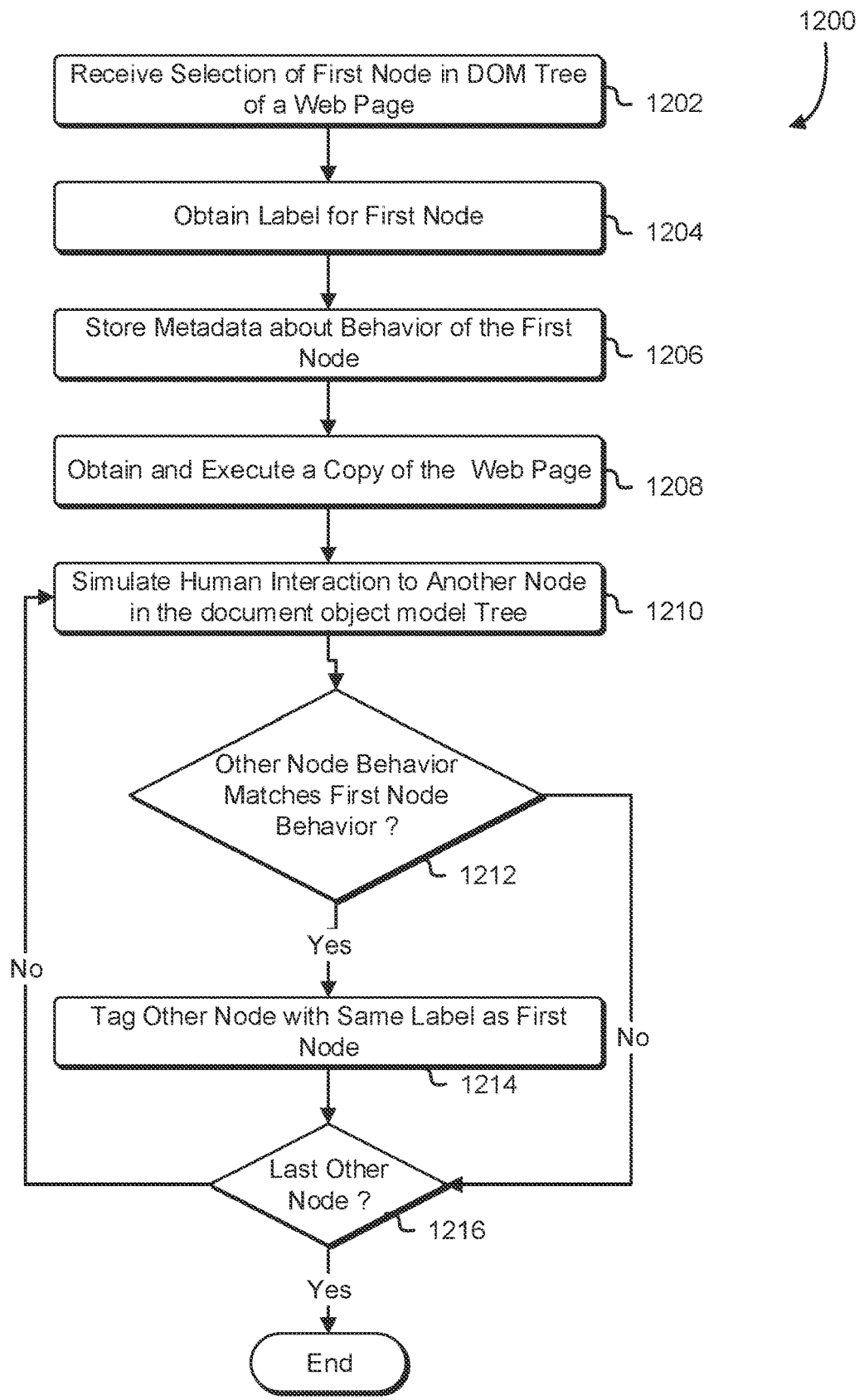
FIG. 12 is a flowchart that illustrates an example of dynamic labeling of functionally equivalent neighboring nodes in accordance with an embodiment.

FIG. 12 is a flowchart illustrating an example of a process 1200 for dynamic labeling of functionally equivalent neighboring nodes in accordance with various embodiments. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory, computer-readable storage medium (e.g., a computer program persistently stored on magnetic, optical, or flash media). For example, some or all of process 1200 may be performed by any suitable system, such as the computing device 1400 of FIG. 14. The process 1200 includes a series of operations wherein a selection of the first node is labeled and its metadata stored, nodes from the obtained web page are compared to the first node and determined whether the behaviors match, and the processes recursively run until there are no other nodes with which to perform a comparison.

In 1202, a system performing the process 1200 receives a selection of the first node in the DOM tree of a web page. It is contemplated that this receival may be made in a variety of ways, such as through a data store, which may be similar to the data store 108 of FIG. 1, a manual input, etc. For example, FIGS. 3-6 and FIGS. 7-11 illustrate examples of the recursive process of the labeling of nodes through a DOM tree.

In 1204, the system performing the process 1200 obtains the label for the first node in the DOM tree. In 1206, the metadata about the behavior of the first node is stored. The behavior metadata may be stored in a data store similar to data store 108 in FIG. 1.

In 1208, a copy of the web page is obtained and executed. The web page is in accordance with the set of web pages 106 as described in FIG. 1. In 1210, human interaction is simulated to another node in the document object model tree. The other node may refer to any node that is not the first node. Simulating human interaction may involve simulating mouse, keyboard or touch events; additionally or alternatively, simulating human interaction may include simulating document object model events, such as simulating a mouse click, simulating a mouse moving over an element, changing an input field, submitting an HTML form, or simulating a keypress. In some examples, simulating human interaction (also referred to as performing simulated human interaction) refers to dynamically simulating input events (e.g., onclick, onmouseover, ondblclick, onselect, ontouchstart, ondrag, onsubmit, etc., events) without human intervention.

In 1212, the other node's behavior is tested against the first node's behavior. If the other node's behavior is functionally equivalent to the first node's behavior, the other node is tagged with the same label as the first node, in accordance with FIG. 1. The process 1200 repeats until the last other node is reached.

However, if the other node's behavior is functionally dissimilar or otherwise indeterminant to the first node's behavior, the process 1200 is prompted as to whether this is the last other node. The last other node may be the last node left in the tree, or if said other node has no children (e.g., it is the last node in its branch). If the process 1200 determines it is the last other node, the process 1200 concludes. If this is not the last other node, the process 1200 recursively draws back to 1210 until the last other node is reached. Note that one or more of the operations performed in 1202-16 may be performed in various orders and combinations, including in parallel.

Figure 13:
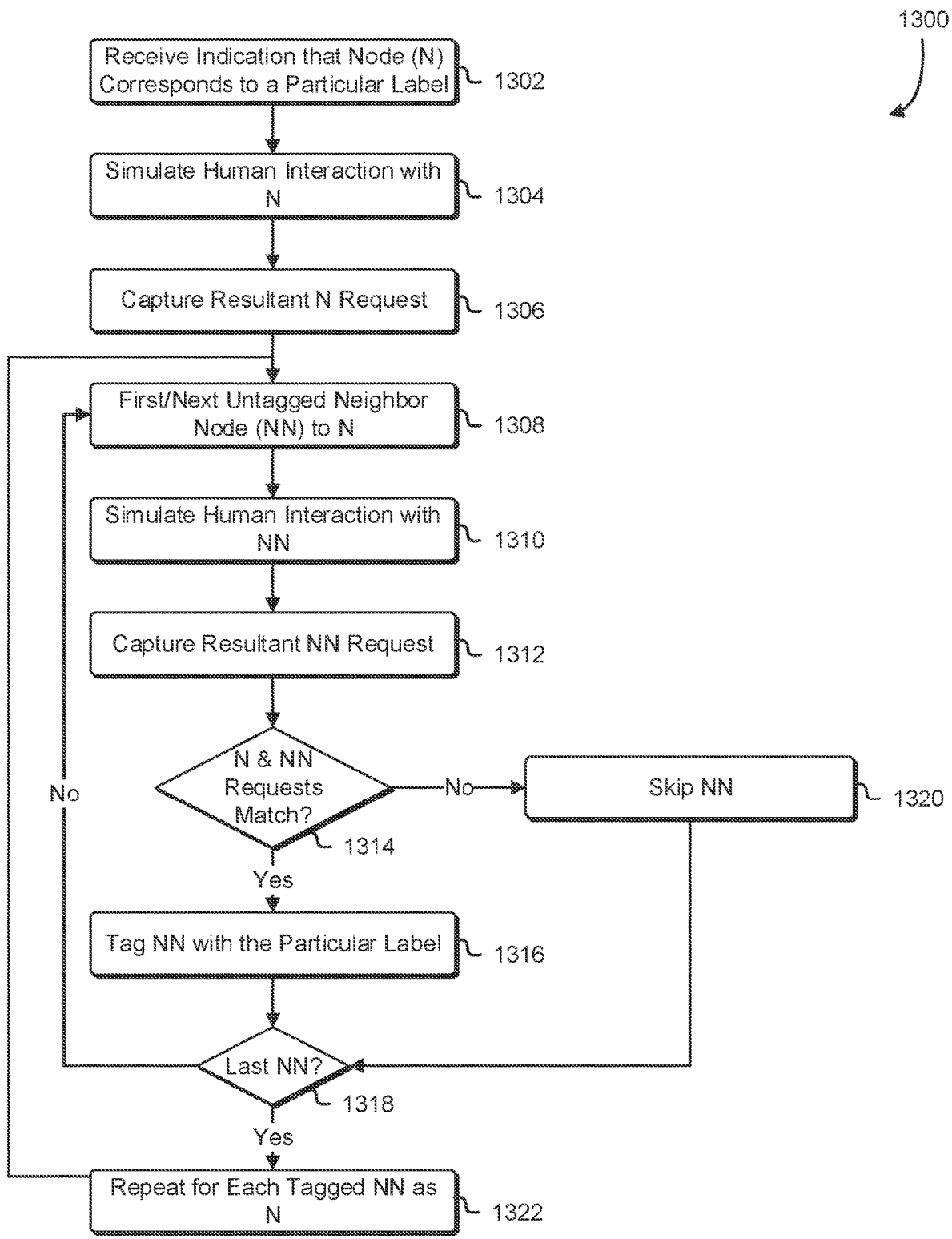
FIG. 13 is a flowchart that illustrates another example of dynamic labeling of functionally equivalent neighboring nodes in accordance with an embodiment.

FIG. 13 is another flowchart illustrating an example of a process 1300 for labeling of nodes in accordance with various embodiments. Specifically, the process 1300 may be a more specific embodiment than that of FIG. 12. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory, computer-readable storage medium (e.g., a computer program persistently stored on magnetic, optical, or flash media). For example, some or all of process 1300 may be performed by any suitable system, such as the computing device 1400 of FIG. 14. The process 1300 includes a series of operations wherein a node is initially labeled, the node is interacted with, and neighboring nodes are checked for functional equivalency to the initially labeled node.

In 1302, a node N, corresponding to an object in an interface, may be labeled with a particular label. In some embodiments, node N may be labeled/annotated by a human operator. The node N may be similar to the annotated nodes 312, 412, 512, 612, 712, 812, 912, 1012, and 1112 of FIGS. 3-11.

In 1304, the node N may be activated. In some embodiments, the activation may occur as a result of performing simulated human interaction with the node. In other implementations, the activation may be performed by a human operator.

In 1306, the system performing the process 1300 captures/intercepts a request generated as a result of the activation performed in 1304. The request may be captured as structured data or as a text string and may be stored as a baseline request for the comparison in 1314 below.

In 1308, the system performing the process 1300 may recursively select a neighbor node NN to the node N. For the neighbor node NN, in 1310, the system may activate the neighbor node, such as by performing simulated human interaction with the neighbor node NN, such as in a manner described in the present disclosure. Then, in 1312, the system may intercept/capture the resultant request generated as a result of the activation performed in 1310 similar to the manner of capture of the baseline request in 1306; that is, the resultant request may be captured as structured data or as a text string and used in the comparison of 1314 below.

In 1314, the system performing the process 1300 may compare the baseline request with the resultant request of 1312 to determine whether the requests sufficiently match. For example, the differences between the baseline request and the resultant request may be determined and if the differences are fewer than a threshold number of differences, the requests may be determined to match. The differences may be computed as a distance metric. If the requests are determined to match (functionally equivalent), the system may proceed to 1316. Otherwise, the system may proceed to 1320 (functionally dissimilar).

In 1316, the system performing the process 1300 may label the neighboring node NN with the same label as the node N so as to indicate that the neighboring node is functionally equivalent. In 1318, the system determines whether all neighboring nodes NN have been checked. If not, the system returns to 1308 to repeat the operations of 1308-18 for the next neighboring node NN. Otherwise, the system proceeds to 1322. In 1320, if the neighboring node NN is determined in 1314 to be functionally dissimilar to the node N, the system performing the process 1300 bypasses 1316 is bypassed and proceeds to 1318.

In 1322, the system repeats the operations of 1308 for each neighboring node NN that was determined to be functionally equivalent to the node N as if the functionally equivalent neighboring node was the node N. That is, each neighboring node to the functionally neighboring node is also checked for functional equivalency to the node N. It is contemplated that a neighboring node, in various embodiments, may not be limited to adjacent nodes, but may also include nodes within a threshold distance (e.g., hops) of the node (where the threshold distance may be a predetermined distance set by an administrator). Once all neighboring nodes have been checked for functional equivalency, the labeled and unlabeled nodes may be used to train a machine learning model to identify the functionality of nodes of a document object model tree of a given interface. Note that the operations of 1302-22 may be performed for multiple interfaces, and then these "augmented" interfaces with their tagged functionally equivalent nodes may be used to derive a dataset for training the machine learning model, such as by generating feature vectors from characteristics of the nodes and inputting the generated feature vectors and their corresponding particular labels as input to the machine learning model being trained. Note also that one or more of the operations performed in 1302-22 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 14:
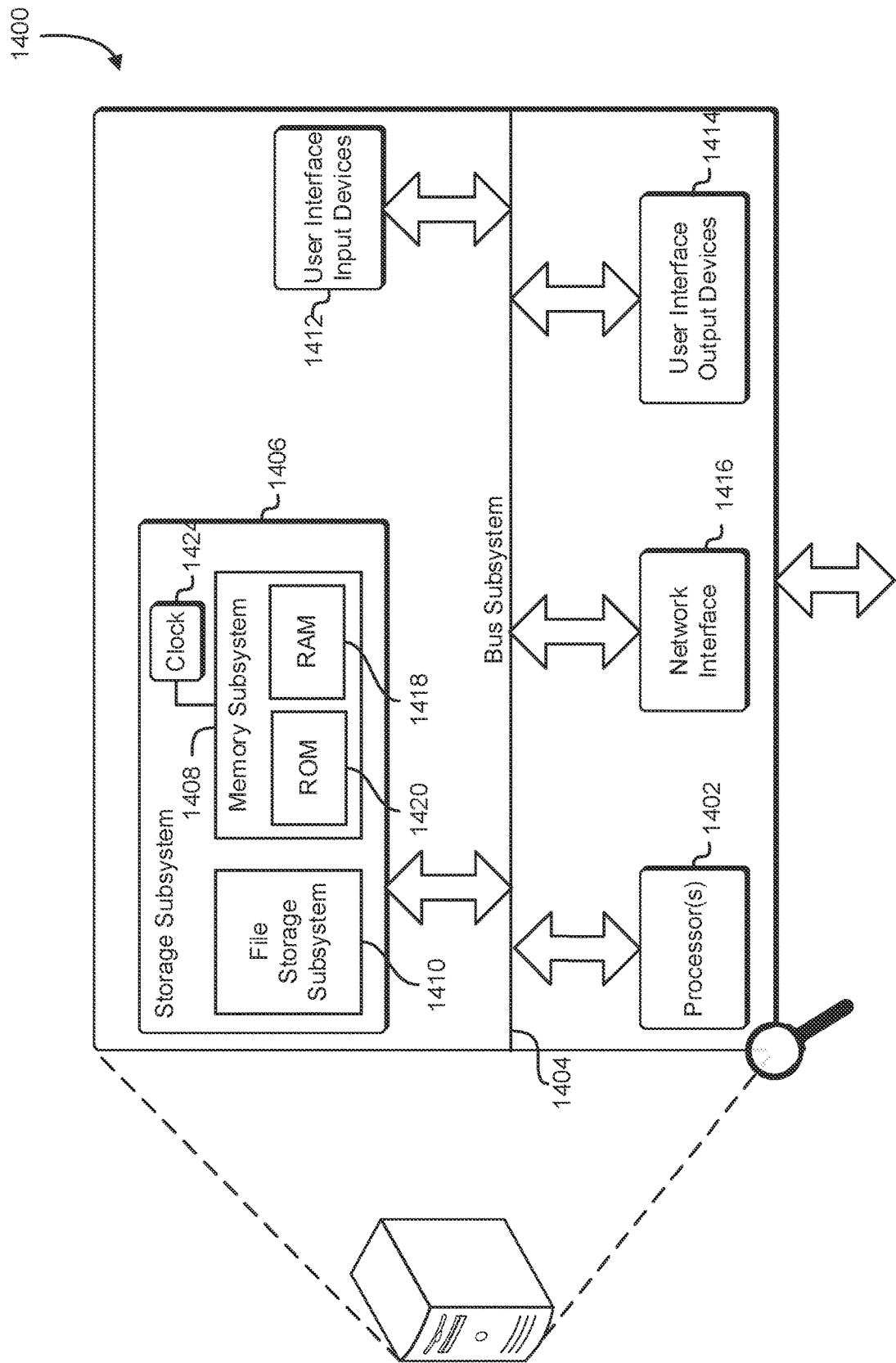
FIG. 14 illustrates a computing device that may be used in accordance with at least one embodiment/an environment in which various embodiments can be implemented.

FIG. 14 is an illustrative, simplified block diagram of a computing device 1400 that can be used to practice at least one embodiment of the present disclosure. In various embodiments, the computing device 1400 includes any appropriate device operable to send and/or receive requests, messages, or information over an appropriate network and convey information back to a user of the device. The computing device 1400 may be used to implement any of the systems illustrated and described above. For example, the computing device 1400 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1400 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 14, the computing device 1400 may include one or more processors 1402 that, in embodiments, communicate with and are operatively coupled to a number of peripheral subsystems via a bus subsystem. In some embodiments, these peripheral subsystems include a storage subsystem 1406, comprising a memory subsystem 1408 and a file/disk storage subsystem 1410, one or more user interface input devices 1412, one or more user interface output devices 1414, and a network interface subsystem 1416. Such storage subsystem 1406 may be used for temporary or long-term storage of information.

In some embodiments, the bus subsystem 1404 may provide a mechanism for enabling the various components and subsystems of computing device 1400 to communicate with each other as intended. Although the bus subsystem 1404 is shown schematically as a single bus, alternative embodiments of the bus subsystem utilize multiple buses. The network interface subsystem 1416 may provide an interface to other computing devices and networks. The network interface subsystem 1416 may serve as an interface for receiving data from and transmitting data to other systems from the computing device 1400. In some embodiments, the bus subsystem 1404 is utilized for communicating data such as details, search terms, and so on. In an embodiment, the network interface subsystem 1416 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1416 is enabled by wired and/or wireless connections and combinations thereof.

In some embodiments, the user interface input devices 1412 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1400. In some embodiments, the one or more user interface output devices 1414 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1400. The one or more user interface output devices 1414 can be used, for example, to present user interfaces to facilitate user interaction with applications performing processes described and variations therein, when such interaction may be appropriate.

In some embodiments, the storage subsystem 1406 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1406. These application modules or instructions can be executed by the one or more processors 1402. In various embodiments, the storage subsystem 1406 additionally provides a repository for storing data used in accordance with the present disclosure. In some embodiments, the storage subsystem 1406 comprises a memory subsystem 1408 and a file/disk storage subsystem 1410.

In embodiments, the memory subsystem 1408 includes a number of memories, such as a main random access memory (RAM) 1418 for storage of instructions and data during program execution and/or a read only memory (ROM) 1420, in which fixed instructions can be stored. In some embodiments, the file/disk storage subsystem 1410 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1400 includes at least one local clock 1424. The at least one local clock 1424, in some embodiments, is a counter that represents the number of ticks that have transpired from a particular starting date and, in some embodiments, is located integrally within the computing device 1400. In various embodiments, the at least one local clock 1424 is used to synchronize data transfers in the processors for the computing device 1400 and the subsystems included therein at specific clock pulses and can be used to coordinate synchronous operations between the computing device 1400 and other systems in a data center. In another embodiment, the local clock is a programmable interval timer.

The computing device 1400 could be of any of a variety of types, including a portable computer device, tablet computer, a workstation, or any other device described below. Additionally, the computing device 1400 can include another device that, in some embodiments, can be connected to the computing device 1400 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1400 for processing. Due to the ever-changing nature of computers and networks, the description of the computing device 1400 depicted in FIG. 14 is intended only as a specific example for purposes of illustrating the preferred embodiment of the device. Many other configurations having more or fewer components than the system depicted in FIG. 14 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1400 may include any appropriate hardware, software and firmware for integrating with a data store as needed to execute aspects of one or more applications for the computing device 1400 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1400 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1400 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1400 may provide the content in one or more forms including, but not limited to, forms that are perceptible to the user audibly, visually, and/or through other senses. The handling of requests and responses, as well as the delivery of content, in an embodiment, is handled by the computing device 1400 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1400 typically will include an operating system that provides executable program instructions for the general administration and operation of the computing device 1400 and includes a computer-readable storage medium (e.g., a hard disk, random access memory (RAM), read only memory (ROM), etc.) storing instructions that if executed (e.g., as a result of being executed) by a processor of the computing device 1400 cause or otherwise allow the computing device 1400 to perform its intended functions (e.g., the functions are performed as a result of one or more processors of the computing device 1400 executing instructions stored on a computer-readable storage medium).

In an embodiment, the computing device 1400 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1400 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1400 is capable of storing, retrieving, and accessing structured or unstructured data. In an embodiment, computing device 1400 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   observing first data within a first request produced by interaction with a first clickable HyperText Markup Language (HTML) element of a web page, the first clickable HTML element corresponding to a first node in a document object model (DOM) tree of the web page;
   obtaining an indication that the first clickable HTML element is assigned to a particular label;
   identifying a second clickable HTML element of the web page, the second clickable HTML element corresponding to a second node adjacent to the first node in the DOM tree;
   observing second data within a second request produced by applying simulated human interaction with the second clickable HTML element;
   comparing the second data with the first data;
   as a result of the second data matching the first data, assigning the second clickable HTML element to the particular label; and
   training a web workflow automation machine learning algorithm using, as input:
   properties of the first clickable HTML element and the second clickable HTML element; and the particular label as a ground truth value.

2. The computer-implemented method of claim 1, wherein:
   the computer-implemented method further comprises performing the simulated human interaction with additional clickable HTML elements corresponding to nodes within a threshold distance to nodes in the DOM tree of clickable HTML elements assigned to the particular label; and
   training the web workflow automation machine learning algorithm is performed after determining that none of the additional clickable HTML elements produce a request matching the first request.

3. The computer-implemented method of claim 1, wherein the first request is a HyperText Transfer Protocol (HTTP) request or a client Uniform Resource Locator (cURL) request.

4. The computer-implemented method of claim 1, wherein assigning the second clickable HTML element to the particular label includes adding a new attribute to the second HTML element with the particular label as an attribute value of the new attribute.

5. A system, comprising:
   one or more processors; and
   memory including computer-executable instructions that, if executed by the one or more processors, cause the system to:
   observe first data within a first request produced by interaction with a first clickable Hypertext Markup Language (HTML) element of a web page, the first clickable HTML element corresponding to a first node in a document object model (DOM) tree of the web page;
   obtain an indication the first clickable HTML element is assigned to a particular label;
   identify a second clickable HTML element of the web page, the second clickable HTML element corresponding to a second node adjacent to the first node in the DOM tree;
   observe second data within a second request generated by performing simulated human interaction with the second clickable HTML element;
   compare the first data with the second data;
   as a result of the second data matching the first data, assign the second clickable HTML element to the particular label; and
   train a web workflow automation machine learning algorithm using, as input:

properties of the first clickable HTML element and the second clickable HTML element; and the particular label as a ground truth value.

6. The system of claim 5, wherein:
the computer executed instructions further comprise instructions that further cause the system to perform the simulated human interaction with additional clickable HTML elements corresponding to nodes within a threshold distance to nodes in the DOM tree of clickable HTML elements assigned to the particular label; and
the computer-executable instructions that cause the system to train the web workflow automation machine learning algorithm further cause the system to train the web workflow automation machine learning algorithm after a determination that none of the additional clickable HTML elements produce a request matching the first request.

7. The system of claim 5, wherein the first request is a HyperText Transfer Protocol (HTTP) request or a client Uniform Resource Locator (URL) request.

8. The system of claim 5, wherein the computer-executable instructions that cause the system to assign the second clickable HTML element to the particular label cause the system to add a new attribute to the second HTML element with the particular label as an attribute value of the new attribute.

9. A non-transitory, computer-readable storage medium storing executable instructions that, if executed by one or more processors of a computer system, cause the computer system to at least:
observe first data within a first request produced by interaction with a first clickable Hypertext Markup Language (HTML) element of a web page, the first clickable HTML element corresponding to a first node in a document object model (DOM) tree of the web page;
obtain an indication the first clickable HTML element is assigned to a particular label;
identify a second clickable HTML element of the web page, the second clickable HTML element corresponding to a second node adjacent to the first node in the DOM tree;
observe second data within a second request generated by performing simulated human interaction with the second clickable HTML element;
compare the first data with the second data;
as a result of the second data matching the first data, assign the second clickable HTML element to the particular label; and
train a web workflow automation machine learning algorithm using, as input:
properties of the first clickable HTML element and the second clickable HTML element; and
the particular label as a ground truth value.

10. The non-transitory, computer-readable storage medium of claim 9, wherein:
the executing instructions further include instructions that further cause the computer system to perform the simulated human interaction with additional clickable HTML elements corresponding to nodes within a threshold distance to nodes in the DOM tree of clickable HTML elements assigned to the particular label; and
the executable instructions that cause the computer system to train the web workflow automation machine learning algorithm further include instructions that further cause the computer system to train the web workflow automation machine learning algorithm after a determination that none of the additional clickable HTML elements produce a request matching the first request.

11. The non-transitory computer-readable storage medium of claim 9, wherein the first request is a HyperText Transfer Protocol (HTTP) request or a client Uniform Resource Locator (URL) request.

12. The non-transitory computer-readable storage medium of claim 9, wherein the executable instructions that cause the computer system to assign the second clickable HTML element to the particular label further include instructions that further cause the computer system to add a new attribute to the second HTML element with the particular label as an attribute value of the new attribute.

\* \* \* \* \*